United States Patent
Jung et al.

(10) Patent No.: US 8,449,434 B2
(45) Date of Patent: May 28, 2013

(54) METHOD FOR CONTROLLING AN AUTOMATED FRICTION CLUTCH

(75) Inventors: Mario Jung, Sinzheim (DE); Cedric Kieffer, Strasbourg (FR); Bjoern Stehle, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/493,326

(22) Filed: Jun. 11, 2012

(65) Prior Publication Data

US 2012/0316033 A1 Dec. 13, 2012

Related U.S. Application Data

(63) Continuation of application No. PCT/DE2010/001378, filed on Nov. 24, 2010.

(30) Foreign Application Priority Data

Dec. 14, 2009 (DE) .................. 10 2009 058 248

(51) Int. Cl.
*B60W 10/02* (2006.01)
(52) U.S. Cl.
USPC .......................................................... 477/181
(58) Field of Classification Search
None
See application file for complete search history.

(56) References Cited

U.S. PATENT DOCUMENTS 5,141,089 A * 8/1992 Nobumoto et al. ........... 477/169

FOREIGN PATENT DOCUMENTS

| DE | 19752276 | 6/1999 |
| DE | 19806497 | 8/1999 |
| DE | 10033647 | 4/2002 |
| DE | 10312088 | 9/2004 |
| DE | 102006037395 | 2/2008 |
| DE | 102009014467 | 10/2009 |
| EP | 2065244 | 6/2009 |

* cited by examiner

*Primary Examiner* — Dirk Wright
(74) *Attorney, Agent, or Firm* — Simpson & Simpson, PLLC

(57) ABSTRACT

The invention relates to a method for controlling an automated friction clutch arranged in a drive train of a motor vehicle between an internal combustion engine and a transmission, and is operated in a travel-controlled manner by means of an actuator controlled by a control unit and transmits a maximum clutch torque while the friction clutch is closed, where an engine's torque provided by the internal combustion engine is reduced when the maximum clutch torque is exceeded and is increased when the maximum clutch torque rises. The engine torque is reduced which corresponds to a reduced transmittable clutch torque when the reduced transmittable clutch torque is detected and is increased to the engine torque corresponding to the maximum transmittable clutch torque after a first time interval expires, where the engine torque is limited by means of a second, longer time interval when a reduced transmittable clutch torque is detected.

4 Claims, 2 Drawing Sheets

METHOD FOR CONTROLLING AN AUTOMATED FRICTION CLUTCH

CROSS-REFERENCE TO RELATED APPLICATIONS

This application is filed under 35, U.S.C. §120, and §365 (c) as a continuation of International Patent Application No. PCT/DE2010/001378, filed Nov. 24, 2010,, which application claims priority from German Patent Application No. 10 2009 058 248.7, filed Dec. 14, 2009,, which applications are incorporated herein by reference in their entireties.

FIELD OF THE INVENTION

The invention relates to a method for controlling an automated friction clutch that is arranged in a drivetrain of a motor vehicle between an internal combustion engine and a transmission, and is operated in a travel-controlled manner by means of an actuator controlled by a control unit, and transmits a maximum clutch torque while the friction clutch is engaged, where an engine torque provided by the internal combustion engine is reduced when the clutch torque falls below the maximum clutch torque and is increased again when the maximum clutch torque rises.

BACKGROUND OF THE INVENTION

Automated friction clutches in the drivetrain of motor vehicles and methods to control them are known. High loads, especially on an incline and/or when a trailer is used, can cause the maximum transmission capacity to he exceeded. The friction clutch consequently overheats and the friction linings are destroyed, so that the motor vehicle is without any safety mechanism. Furthermore, component tolerances can cause insufficient pressure to be provided, or the coefficient of friction of the friction linings and/or their opposing friction surfaces to be too low, when friction clutches are compressed and then generate increasing clutch torque by an axial load on the clutch lever. Furthermore, in addition to destroying the friction lining, heating it lowers the coefficient of friction, and a less aggressive treatment of the heated friction linings can protect them from being destroyed.

Various measures have therefore been pursued to prevent the friction clutch from being overheated, especially the friction lining of the clutch disc. When friction clutches are applied, the friction clutch is engaged or disengaged when the specified temperature limits are exceeded to notify the driver of the situation of the friction clutch and cause the friction clutch to be cooled.

Another option is to limit the engine torque which, in an extreme case, can cause the internal combustion engine to be deactivated. As disclosed in German Patent No. 19752276 A1,, the engine torque is limited as the speed of the internal combustion engine is monitored in the specified driving situations, for example, while starting up. If the speed is exceeded, the engine torque is restricted to a specified value, and the restriction is lifted when the speed falls below the limit. This can cause uncomfortable alternation between torque limitation and its release.

A protective strategy for an automatic friction clutch is known from German Patent Application No. 10 2009 014 467, A1. When the friction clutch experiences slip, the engine torque is reduced until the driver requires greater torque. A new control loop is run. through, and the driver is warned, if applicable. It is therefore not possible to specifically lower the engine torque to protect the friction clutch independent of the driver's required torque. If, for example, the driver continuously requires greater torque than the reduced engine torque, he will be warned if it cannot be provided. However, when the driver's required torque remains below the reduced engine torque, it is not independently increased, and consequently a triggered increase or restoration of the driver's required torque is not immediately available when greater engine torque is suddenly demanded. Furthermore, the routine is suspended for limiting the engine torque when the driver's desired torque is lower than the limited engine torque, and a new slip control is activated that can cause the friction clutch to heat up and the transmissible clutch torque to be reduced.

The commonality of these procedures is that the friction clutch, which can only transmit limited torque in comparison to its maximum transmissible torque in its current operating state, for example, due to an elevated operating temperature, dirt, etc., is additionally negatively influenced by the review of its operability and is sometimes further damaged. To effectively protect the friction clutch and prevent additional checking routines which continue to generate friction clutch slip and further enhance the fault, the identified fault (fading) is therefore necessarily sustained with less transmissible torque, and therefore limited engine torque, until perhaps the internal combustion engine is turned off. This is associated with a loss of comfort to the driver since he has to dispense with some of the performance of the internal combustion engine, even though the friction clutch is capable of transmitting its maximum torque.

BRIEF SUMMARY OF THE INVENTION

The object of the invention is therefore to propose an improved method for protecting a friction clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE INVENTION

At the outset, while the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
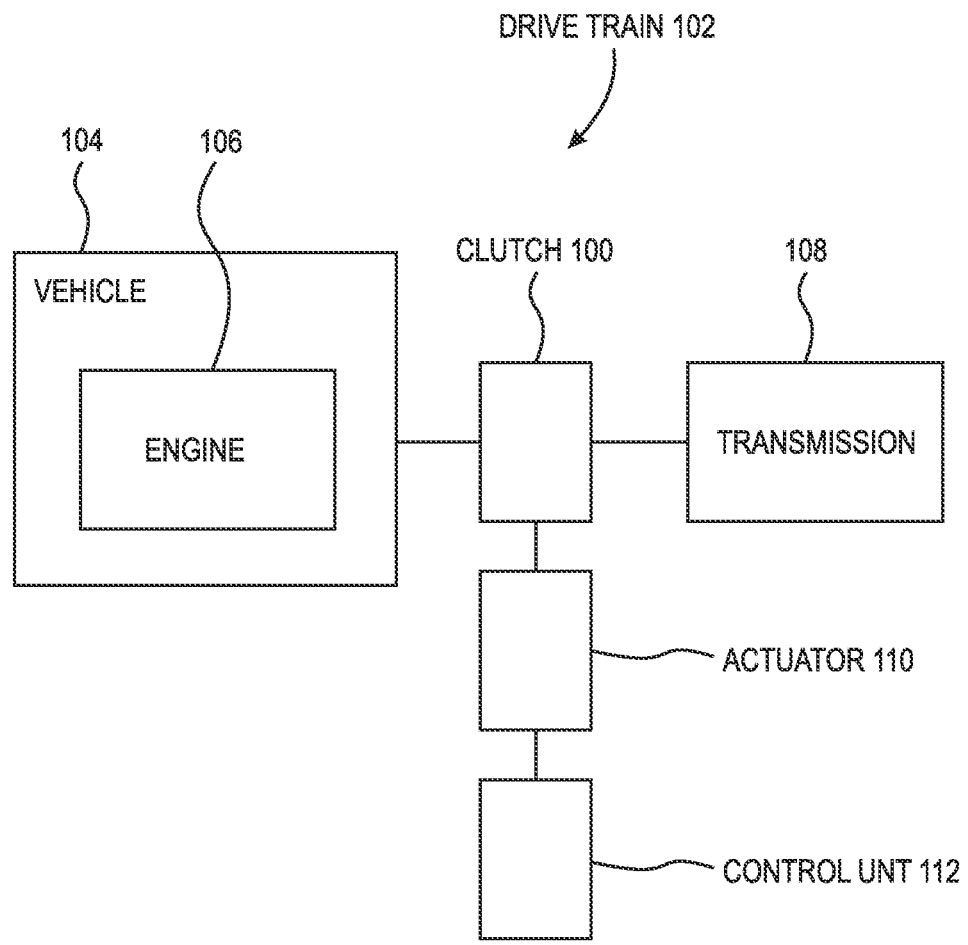
FIG. 1 is a schematic block diagram illustrating a method for controlling an automated friction clutch.
Figure 2:
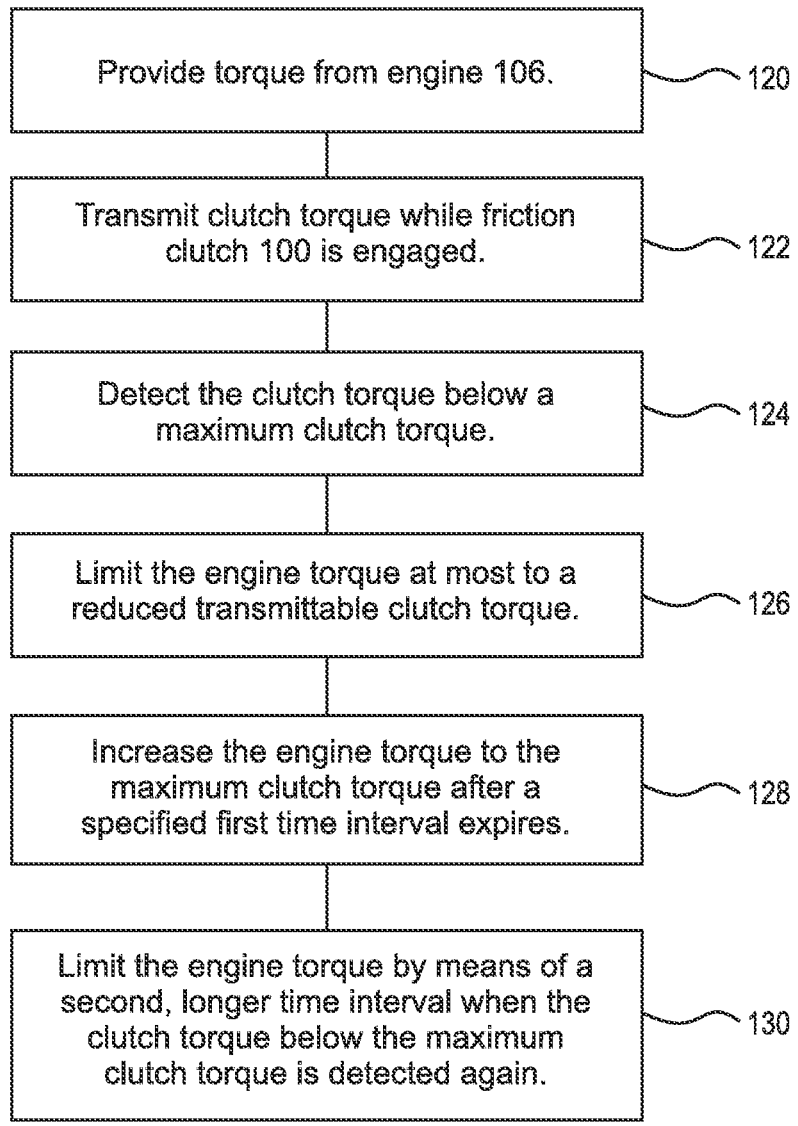
FIG. 2 is a flow chart illustrating a method for controlling an automated friction clutch.

FIG. 1 is a schematic block diagram illustrating a method for controlling an automated friction clutch, FIG. 2 is a flow chart illustrating a method for controlling an automated friction clutch. The object of the invention is achieved by means of a method for controlling an automated friction clutch 100 that is arranged in a drivetrain 102 of a motor vehicle 104 between an internal combustion engine 106 and a transmission 108, and is operated in a travel-controlled manner by means of an actuator 110 controlled by a control unit 112, and transmits a clutch torque while the friction clutch is engaged. The engine torque provided by the internal combustion engine is reduced when the clutch torque falls below a maximum clutch torque, and is increased again when the clutch torque rises. The clutch torque rises by limiting the engine torque to a reduced engine torque that corresponds at most to a reduced transmittable clutch torque when the clutch torque below the maximum clutch torque is detected The engine torque is increased again to the engine torque corresponding to the maximum clutch torque after a specified first time interval expires. The engine torque is limited by means of a second, longer time interval when the clutch torque below the maximum clutch torque is detected again. In FIG. 2, step 120 provides torque from engine 106. Step 122 transmits clutch torque while friction clutch 100 is engaged. Step 124 detects the clutch torque below a maximum clutch torque. Step 126 limits the engine torque at most to a reduced transmittable clutch torque. Step 128 increases the engine torque to the maximum clutch torque after a specified first time interval expires. Step 130 limits the engine torque by means of a second, longer time interval when the clutch torque below the maximum clutch torque is detected again.

The first time interval is set so that an overheated friction clutch can cool down and regain its normal transmission behavior. The corresponding time interval depends on the vehicle, climate and design of the drivetrain. A time interval, for example, of 3, to 10, minutes has proven to be a practical quantity. After the first time interval has passed, the original engine torque, or an elevated engine torque not yet corresponding to the original engine torque, can be applied. If the friction clutch then remains continuously operable without slip, the engine torque that has not yet been fully increased can be adjusted to the original, transmissible clutch torque without a problem, and the routine can be ended. If slip continues or recurs, for example, because the friction clutch has not sufficiently cooled due to unfavorable ambient conditions, the second time interval can extend the use of reduced engine torque. The second time interval can, for example, approximately correspond to twice the length of the first time interval, ensuring that the friction clutch has cooled sufficiently.

If, after the second time interval expires, the friction clutch is still experiencing slip, experience has shown that the friction clutch may have an additional defect, and the engine torque is continuously restricted to a reduced engine torque corresponding at most to the reduced transmissible clutch torque, at least until the next time the internal combustion engine is turned off. A corresponding driver warning can be issued. Furthermore, driver warnings, or at least driver information, can be communicated acoustically, visually and/or in another manner that is perceptible to the driver each time the engine torque automatically changes, that is, when the engine torque is restricted or the restriction is lifted. However, to keep the driver from being overloaded with such warnings or instructions, it is preferable to only issue warnings that significantly influence safe operation, for example, when the engine torque is reduced so much so that overtaking is impossible, or when the friction clutch is so damaged that it threatens to fail.

Such states can be identified by means of thresholds such as the absolute limited torque, the gradual engine torque behavior, the ratio of maximum engine torque to lowered engine torque, and/or the like.

The friction clutch can be an active or engaging friction clutch that is disengaged in a relaxed state and is engaged by means of a clutch lever, such as a disk spring or lower spring, supported on the housing. The engaged friction clutch can be combined with another friction clutch into a double clutch for a transmission designed as a double clutch transmission. Alternately, the friction clutch can be an inactive or disengaging friction clutch that is engaged in a state that is not activated by an actuator and is disengaged by an actuator under the application of axial force.

The actuator can be a slave cylinder that is hydrostatically actuated by a master cylinder, e.g., arranged concentrically around the transmission input shaft, a hydraulically, hydrostatically or electrically actuated release lever of a release mechanism actuated outside of the clutch case, or a lever actuator where the lever is extended axially by a roller resting between a lever and a base plate by means of a spindle moved by an electric motor and contacts the clutch lever with an intermediate release bearing. The actuator is controlled by the control unit. The control unit can contain suitable clutch characteristics or relationships saved as formulas between the traveled path and the associated transmission capacity of the friction clutch that are calibrated and continuously adapted as a function of the temperature of the friction clutch, its wear, and material-specific quantities.

The lever tips of the clutch lever contacted by the actuator are axially displaced by the actuator that engages, in a travel-controlled manner, the friction bearing of the clutch disc arranged between a pressure plate axially contacted by the clutch lever and a fixed counter pressure plate. The axially traveled path of the actuator, and hence the lever tips, yield a path-dependent clutch torque, where the maximum clutch torque is achieved when a predetermined path threshold is exceeded. If due to insufficient pressure, a worsened coefficient of friction from increased temperature, or other influences, the transmission capacity of the friction clutch decreases and undesirable slip arises while the paths of the actuators are beyond the path threshold, and this cannot be compensated for by applying additional pressure to the pressure plate by the additional travel of the lever tips, the engine torque of the internal combustion engine is reduced by a predetermined value that substantially corresponds to the adhesion of the friction clutch without slip under these conditions.

The engine torque is adapted in the suggested manner to the remaining maximum clutch torque depending on the undesired slip. The slip is advantageously calculated in the control unit, for example, from the difference between the engine speed and the speed of the transmission input shaft of the relevant friction clutch that can also be calculated from the transmission ratio of the gearbox and the representative wheel speeds. The slip is preferably regulated in the control unit. By means of this slip regulation, a microslip of, e.g., up to 50, rpm is regulated by modulating the clutch, that is, the actuator path is increased or decreased. If there is insufficient pressure, the further infeed of the friction clutch by the actuator can no longer reduce the slip. When a predetermined quantity of slip is exceeded, the engine torque is therefore lowered over the duration of the first time interval. The quantity can be directly transmitted to the engine control unit by means of a separate analog or digital line, through a data network such as a CAN bus or telemetrically and used to control the parameters influencing the engine torque such as the throttle valve position, the ignition angle and/or the dwell angle.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A method for controlling an automated friction clutch that is arranged in a drivetrain of a motor vehicle between an internal combustion engine and a transmission, and wherein the friction clutch is operated in a travel-controlled manner by means of an actuator controlled by a control unit, and transmits a clutch torque while the friction clutch is engaged, comprising:

providing torque from the engine;
transmitting clutch torque while the friction clutch is engaged;
detecting the clutch torque below a maximum clutch torque;
limiting the engine torque at most to a reduced transmittable clutch torque;
increasing the engine torque to the maximum clutch torque after a specified first time interval expires; and,
limiting the engine torque by means of a second, longer time interval when the clutch torque below the maximum clutch torque is detected again.

2. The method as recited in claim 1, further comprising limiting the engine torque after a reduced transmissible clutch torque is detected after expiration of the second time interval until the internal combustion engine is turned off to a reduced engine torque that corresponds at most to a reduced transmittable clutch torque.

3. The method as recited in claim 1, wherein a driver of the motor vehicle is informed when the engine torque changes.

4. The method as recited in claim 2, wherein a driver of the motor vehicle is informed when the engine torque changes.

* * * * *